United States Patent [19]
Hoshiba et al.

[11] Patent Number: 6,109,235
[45] Date of Patent: Aug. 29, 2000

[54] IGNITION TIMING CONTROL FOR MARINE ENGINE

[75] Inventors: Akihiko Hoshiba; Kazuhiro Nakamura, both of Shizuoka, Japan

[73] Assignee: Sanshin Kogyo Kabushiki Kaisha, Shizuoka-ken, Japan

[21] Appl. No.: 09/127,012

[22] Filed: Jul. 31, 1998

[30] Foreign Application Priority Data

Jul. 31, 1997 [JP] Japan ................................. 9-206454

[51] Int. Cl.⁷ .................................................. F02M 3/00
[52] U.S. Cl. ............................... 123/339.11; 123/406.53; 123/406.55
[58] Field of Search .................. 123/339.11, 406.55, 123/406.53

[56] References Cited

U.S. PATENT DOCUMENTS

| | | | |
|---|---|---|---|
| 4,506,639 | 3/1985 | Murakami et al. | 123/339.11 |
| 4,606,315 | 8/1986 | Tobinaga et al. | |
| 4,633,834 | 1/1987 | Takeuchi et al. | |
| 4,790,279 | 12/1988 | Tobinaga et al. | |
| 4,858,585 | 8/1989 | Remmers | 123/406.55 |
| 4,895,120 | 1/1990 | Tobinaga et al. | |
| 4,966,115 | 10/1990 | Ito et al. | |
| 4,998,521 | 3/1991 | Inoue et al. | |
| 5,080,067 | 1/1992 | Nakamura | |
| 5,121,726 | 6/1992 | Di Nunzio et al. | 123/339.11 |
| 5,197,430 | 3/1993 | Hoshiba et al. | |
| 5,201,284 | 4/1993 | Umehara | 123/406.55 |
| 5,280,772 | 1/1994 | Weber et al. | 123/339.11 |
| 5,309,882 | 5/1994 | Hoshiba et al. | 123/339.11 |
| 5,606,952 | 3/1997 | Kanno et al. | |
| 5,626,120 | 5/1997 | Akatsuka | |
| 5,653,208 | 8/1997 | Nakamura | |
| 5,655,498 | 8/1997 | Suzuki et al. | |
| 5,699,766 | 12/1997 | Saito | |
| 5,706,783 | 1/1998 | Sawada | |
| 5,713,334 | 2/1998 | Anamoto | |
| 5,738,074 | 4/1998 | Nakamura et al. | |
| 5,762,053 | 6/1998 | Anamoto | |
| 5,775,297 | 7/1998 | Koike et al. | |
| 5,778,857 | 7/1998 | Nakamura et al. | |
| 5,921,220 | 7/1999 | Kato | 123/406.55 |

*Primary Examiner*—John Kwon
*Attorney, Agent, or Firm*—Knobbe, Martens, Olson & Bear LLP

[57] ABSTRACT

The present invention is an ignition control system controlling ignition firing timing of an ignition element associated with an engine. The engine includes an output shaft powering a water propulsion device, an intake system including a throttle valve, and a sensor providing an output signal corresponding to each revolution of the output shaft. The ignition control system calculates a base ignition firing timing from a time between successive previous output signals, and determines if a low-temperature idle condition of engine exists from the sensed throttle angle and coolant temperature. If such condition exists, the ignition control system also determines a compensation value to compensate ignition timing to either the advance or delay side to generally match a target engine speed for a given coolant temperature, and modifies the basic ignition firing timing by the compensation value.

21 Claims, 9 Drawing Sheets

6,109,235

IGNITION TIMING CONTROL FOR MARINE ENGINE

FIELD OF THE INVENTION

The present invention relates to an engine ignition control system and more particularly to an improved arrangement for controlling the ignition timing of an engine during start-up conditions.

BACKGROUND OF THE INVENTION

An outboard motor often powers a watercraft. The motor includes a water propulsion device, such as a propeller, which is powered by an internal combustion engine. The engine has an output shaft that drives the water propulsion device.

The engine normally drives the propulsion device via a transmission. The transmission usually includes a dog clutch that moves between a pair of gears to couple a propulsion shaft to a drive shaft that the engine powers. The clutch moves between three drive positions: one position corresponds to a forward drive condition; another corresponds to a neutral drive condition; and another position corresponds to a reverse drive condition. An actuator moves the clutch between these positions, and forces the clutch into engagement with the driven gears to establish either the forward or reverse drive condition.

Cold starts of engine often are difficult due to poor combustibility during start-up. Some prior engines have addressed the problems associated with start-up operation by increasing the engine's idle speed until the engine has warmed to a sufficient degree (e.g., 40° C.). Fuel and intake air volumes are often temporarily increased to elevate engine speed until the engine has warmed. Spark timing may also be advanced during start-up operations to a minimum advancing degree so as to obtain maximum torque in some applications (e.g., in automobiles).

This approach, however, can not be employed with an outboard motor. If the idle speed is too high, transmission engagement is difficult and not smooth. And if engine torque is set high during idle conditions, clutch engagement also is not smooth, even with low idle speed.

Outboard motors previously have controlled engine warm-up in the manner graphically represented in FIG. 9 (see the description of this figure below for explanation of the depicted curves). Immediately after the engine is started, the throttle valve is opened to decrease resistance to air intake as the engine begins to breath. The fuel volume added to the intake air to form the fuel charge is also increased immediately after the engine start (as represented by the straight section of curve a in FIG. 9). During this initial period, ignition timing also is advanced to 10° before top dead center (BT10). The increase of the intake air volume and fuel volume is terminated after a certain period of time regardless of the coolant temperature. The ignition timing is delayed for every 15° (as represented by line f) along with the increase of coolant temperature (as represented by line b). The engine speed (as represented by line e) is gradually reduced until the coolant temperature reaches a preset temperature (such as, for example, 40° C.). The engine speed will slow to its normal idling speed ($N_{ID}$) when the coolant temperature finally warms to 40° C. and the ignition timing is delayed or retarded up to 10° after top dead center (AT10).

This engine warm-up control method offers the advantage that the time period at which the engine speed is high is relatively short because the increase of intake air volume and fuel volume is limited only for a short period of time after the engine starts. Thus, the transmission can be engaged shortly after the engine start without encountering difficulties or significant mechanical shock.

Although theoretically this engine warm-up control method provides a suitable solution for the outboard motor application, it does not perform as well in practice. Because of errors in the manufacture the assembly process of the engine, each engine may have differing operating characteristics. Accordingly, the produced engine speed during engine warm-up may fluctuate from the design engine speed (as represented by line e). Some engines produce unexpectedly low or high speeds at a given coolant temperature and same advanced angles, as illustrated in FIG. 9, where phantom line c illustrates a higher engine speed relative to a design engine speed (line e), and phantom line d represents the lower engine speed relative to the design engine speed (line e). As a result, the engine may stall or may idle for a longer period of time at an elevated speed, which makes transmission shifting difficult until the engine warms.

SUMMARY OF THE INVENTION

A need therefore exists for an improved ignition timing control system for an engine during start-up condition.

One aspect of the present invention involves a method of controlling ignition firing timings of an ignition element associated with the engine. The engine includes an intake system having at least one throttle valve and a cooling system containing coolant. The method involves sensing coolant temperature and an opening degree of the throttle valve. Engine speed is determined and ignition timing is computed based upon the determined engine speed and the sensed throttle valve opening degree. A low-temperature idle state of the engine is detected based upon the sensed coolant temperature. Ignition timing is compensated to an advance or delay side while the engine is in the low-temperature idle state so as to adjust engine speed to generally match a preset target engine speed corresponding to the sensed coolant temperature.

Another aspect of the present invention involves a control system for controlling the ignition firing of an engine ignition element. The engine includes an air intake system having at least one throttle valve and a coolant system containing coolant. The control system comprises an engine speed detector, a crankshaft angle detector, and a coolant temperature sensor. An ignition timing controller is connected to the crankshaft angle detector and the engine speed detector so as to receive signals from the sensors. These signals are indicative of a crankshaft angle of the engine and the engine rotational speed, respectively. The ignition timing control outputs an ignition timing signal. An ignition timing compensation controller is connected to the coolant sensor and to the engine speed sensor. The ignition timing compensation controller receives signals from these sensors, which are indicative of the coolant temperature and engine speed, respectively. The ignition timing compensation controller outputs a warm-up ignition timing compensation signal that selectively combines with the timing signal output from the ignition timing controller to produce an adjusted timing signal. In a preferred mode, the adjusted timing signal is output to a capacitor-discharge ignition circuit of the engine.

In accordance with another aspect of the present invention, a control system for controlling ignition firing of an engine ignition element is provided. The engine includes an air intake system having at least one throttle valve and a cooling system containing coolant. The control system comprises an engine state detection means for detecting the operational state of the engine. An ignition control means determines the basic ignition timing based upon the determined operational state of the engine as detected by the engine state detection means. A low-temperature idle condition detection means is provided for detecting a low-temperature idle state condition based upon the coolant temperature. A compensation means for compensating the basic ignition timing is provided. The compensation means either advances or delays the basic ignition timing while the engine is in the low-temperature idle state so as to approximate a preset target engine speed.

BRIEF DESCRIPTION OF THE DRAWINGS

The above-mentioned and other features of the invention will now be described with reference to the drawings of a preferred embodiment of the present ignition timing control system for an engine. The illustrated embodiment is intended to illustrate, but not to limit the invention. The drawings contain the following figures.

DETAILED DESCRIPTION OF THE PREFERRED EMBODIMENT OF THE INVENTION

The present invention relates to an ignition system of an engine. Preferably, the ignition system is associated with an engine used in a marine application, such as for powering an outboard motor. The invention comprises an ignition timing control system for timing the firing of ignition elements of the engine. Those of skill in the art will appreciate that the ignition control system of the present invention may be used with engines adapted for use in other applications.

Figure 1:
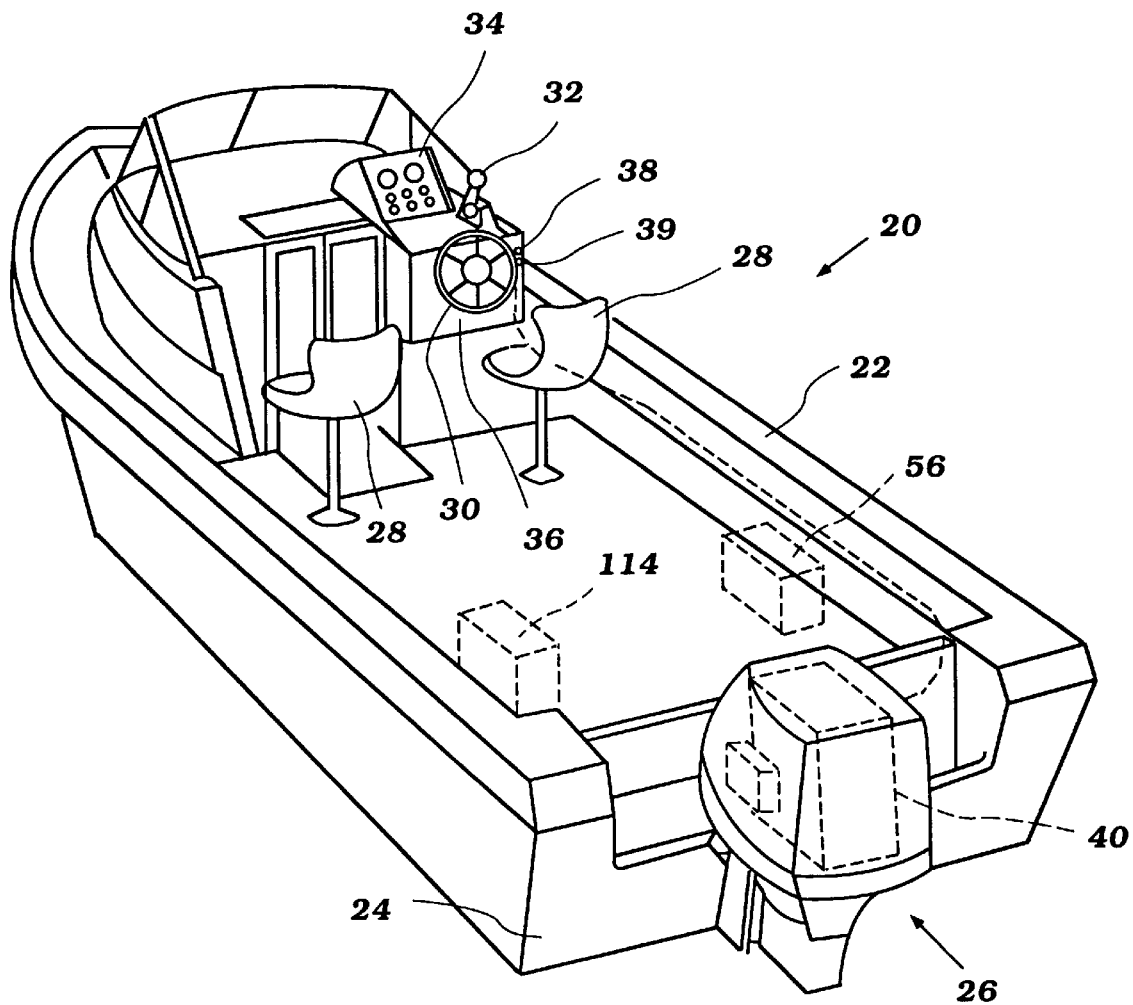
FIG. 1 is a perspective view of a watercraft propelled by an outboard motor.

FIG. 1 illustrates an exemplary watercraft 20. The illustrated watercraft 20 is a power boat, but the watercraft in connection with which the present invention can be used may be any of a wide variety of watercraft types. The watercraft 20 has a hull 22 with a transom 24.

An outboard motor 26 is mounted to the transom 24 to propel the watercraft 20. As known to those skilled in the art, the motor 26 may also be of the inboard type. When of the outboard variety, the motor 26 is connected to the watercraft 20 in a manner which allows it to pivot up and down in a vertical plane ("trimming") and rotate left and right in a horizontal plane ("steering") in a conventional manner.

The watercraft 20 illustrated includes a pair of seats 28. One of the seats 28 is preferably positioned near a steering wheel 30. The steering wheel 30 is connected remotely to the outboard motor 26 for effectuating movement of the motor left and right for steering the craft. Additionally, a throttle control such as a handle 32 is preferably positioned near the steering wheel 30 for use in controlling the speed of the watercraft 20 by changing the speed of the engine powering the motor 26 (as described below).

This handle 32 desirably simultaneously serves as a shift control lever for controlling the position of a transmission 74 (FIG. 2) associated with the motor 26 and as a throttle control. In general, such a control is arranged so that in one position of the handle 32, the transmission 74 is set to neutral and the engine to an idle speed, in a range of positions the transmission 74 is moved to a forward drive position and the engine may be operated from idle to a high speed, and in yet another range of positions the transmission 74 is moved to a reverse drive position and the engine may again be operated between an idle speed and a high speed.

A control panel 34 is preferably provided near the steering wheel 30, the control panel 34 having one or more gauges, meters or other displays for displaying various information to the user of the watercraft 20. These displays can display watercraft speed and other conventional information. A switch panel 36 is also provided near the steering wheel 30. The switch panel 36 preferably includes one or more switches or controls, such as a main switch 38 and a kill switch 39.

As seen in FIG. 1, the motor 26 includes a water propulsion device, such as a propeller (not shown), which is powered by an engine 40. The engine 40 is preferably mounted within a cowling of the motor 26. Of course, as noted above, the engine 40 may be of the "inboard" variety as known to those in the art.

The engine 40 may be arranged in a variety of configurations, such as in-line, "V" or opposed, may operate on a two or four-cycle principle, and be of the rotary, reciprocating piston or other type. Preferably, the engine 40 has four cylinders (and thus four combustion chambers) each having a piston reciprocally mounted therein and attached to a crankshaft and operates on a four cycle principle. The engine 40 is oriented within the cowling so that the crankshaft is generally vertically extending and in driving relation with the water propulsion apparatus of the motor 26.

Figure 2:
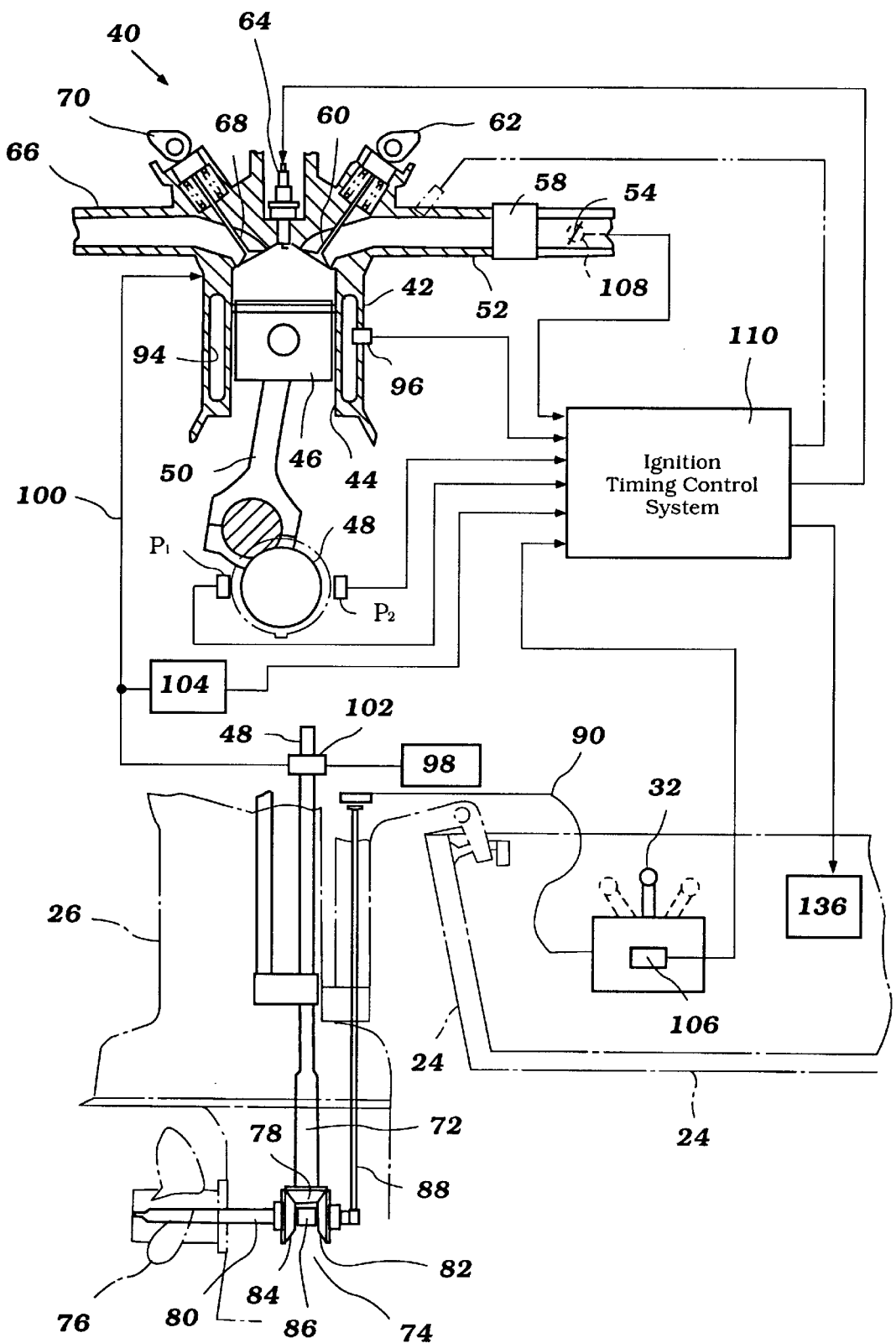
FIG. 2 is a schematic illustrating the interrelationship of an engine of the motor, a transmission of the motor, and an igniting timing control in accordance with the present invention.

The outboard motor 26, including the engine 40, will now be described in more detail with reference to FIG. 2. As illustrated, the engine 40 has a body 42 which defines the cylinders 44. A piston 46 is reciprocally mounted in each cylinder 44. The piston 46 is connected to a crankshaft 48 with a connecting rod 50. A combustion chamber is defined above the piston 46 in the cylinder 44.

Air is supplied to the combustion chamber through an intake system which includes an intake pipe 52. The intake pipe 52 leads from an air intake to the combustion chamber.

A throttle valve 54 is arranged to control the air flow through the intake pipe 52. Preferably, the throttle valve 54 comprises a plate which is rotatably mounted in the intake pipe 52. The throttle valve 54 is moveable to a first position in which it is closed or generally closed for operating the engine 40 at an idle speed, and a wide-open position in which the speed of the engine 40 is high. As described above, the position of the throttle valve 54 is preferably controlled remotely by the operator of the watercraft 20 with the handle 32 through an appropriate linkage.

A fuel system supplies fuel for combustion with the air in the combustion chamber. The fuel system includes a fuel supply, such as a fuel tank 56 (FIG. 1) mounted in the watercraft 20. The fuel system delivers fuel from the supply to one or more charge formers. As illustrated in FIG. 2, the charge former comprises a carburetor 58 associated with the intake pipe 52 and arranged to deliver fuel into the air passing through the intake pipe 52. As illustrated, a separate intake pipe 52 and carburetor 58 are provided for each cylinder 44. Common intake pipes and carburetors may be used for all cylinders 44, however. The rate of fuel delivery by the carburetor desirably is governed by the throttle control, which also controls the throttle valve 54. Of course, the fuel may be supplied with one or more fuel injectors or other charge formers.

The flow of air and fuel into the combustion chamber is regulated in a timed manner with an intake valve 60. This valve 60 selectively opens and closes the passage leading into the combustion chamber as controlled by a camshaft 62 or similar mechanism. The position of the throttle valve 60, and thus the speed of the engine 40, is preferably controlled by the operator of the watercraft 20 remotely with the throttle/shift lever 32.

As described in detail below, combustion of the air and fuel mixture in the combustion chamber is initiated with a spark plug 64 or other ignition device. The spark plug 64 is controlled with an ignition timing system in accordance with the present invention.

The products of combustion are routed from the combustion chamber to a point external to the outboard motor 26 through an exhaust system. This exhaust system includes an exhaust passage leading from the combustion chamber to an exhaust pipe 66. An exhaust valve 68 controls the flow of exhaust to the exhaust pipe 66 in a timed manner. As with the intake valve 60, the exhaust valve 68 is preferably controlled by a camshaft 70 or similar mechanism. The exhaust is routed from the exhaust pipe 66 to a point external to the motor 26.

The intake and exhaust camshafts 62, 70 may be driven by the crankshaft 48 of the engine 40, by separate motors or in other manners well known to those of skill in the art. In addition, the intake and exhaust camshafts may comprise a single common camshaft.

The crankshaft 48 of the engine 40 is preferably vertically extending and is arranged to drive a drive shaft 72. The drive shaft 72 selectively drives the water propulsion device of the motor 26 through a transmission 74. As illustrated, the water propulsion device comprises a propeller 76.

A drive gear 78 is mounted on the drive shaft 72. A forward gear 82 and reverse gear 84, which are associated with the transmission 74, and are supported about a propeller shaft 80. The propeller shaft 80 drives the propulsion device 76. A dog clutch 86 is splined to the propulsion shaft 80 and can be moved between and into and out of engagement with the forward and reverse gears 82, 84. Because the gears 82, 84 rotate in opposite directions, the direction of drive can be changed by moving the dog clutch 86 between a first position, in which the dog clutch 86 engages the forward gear 82 to establish a forward drive condition, and a second position, in which the dog clutch 86 engages the rear gear 84 to establish a reverse drive condition. The dog clutch 86 can also be moved into a third position between the gears 82, 84. This position corresponds to a neutral drive condition.

As illustrated, the transmission 74 is controlled with a shift rod 88 in a known manner. The shift rod 88 is actuated by the shift/throttle lever 32 mounted in the watercraft 20 via a control cable 90 or other linkage.

Though not illustrated in detail, the engine 40 preferably includes a liquid cooling system. This system includes means, such as a pump, for supplying coolant from a coolant supply to one or more water jackets 94. Preferably, the cooling system is arranged to draw water from the body of water in which the watercraft 20 is operating for use as the coolant in the cooling system.

A lubricating system provides lubricant to various portions of the engine 40. This system includes a lubricant or oil supply, such as in a reservoir 98 and means for delivering the lubricant from the supply through one or more passages 100. In the arrangement illustrated, the means for delivering comprises an oil pump 102 which is driven directly by the crankshaft 48.

A variety of sensors are associated with the motor 26. Preferably, a temperature sensor 96 is associated with the one of the water a jackets 94 for sensing the temperature of the coolant therein. An oil pressure sensor or switch 104 monitors the pressure of the lubricant in the lubricating system. A shift position switch 106 monitors the position of the shift/throttle handle 32. A throttle valve position sensor 108 monitors the throttle valve 54 position or angle.

The output from these various sensors is provided to an ignition timing control system 110 configured in accordance with a preferred embodiment of the present invention. The ignition timing control is used to control an ignition system which is used to initiate combustion of the air and fuel mixture supplied to each combustion chamber.

As described above, this ignition system includes at least one spark plug 64 associated with each cylinder 44. Where the engine 40 has four cylinders 44, as described above, there are four spark plugs, a first 64-1 corresponding to a first cylinder, a second 64-2 corresponding to a second cylinder, a third 64-3 corresponding to a third cylinder, and a fourth 64-4 corresponding to a fourth cylinder. As described in more detail below, a firing mechanism is associated with the spark plugs 64 for inducing a spark across a gap each spark plug 64 in order to initiate ignition of the fuel and air mixture within a combustion chamber or cylinder.

Figure 3:
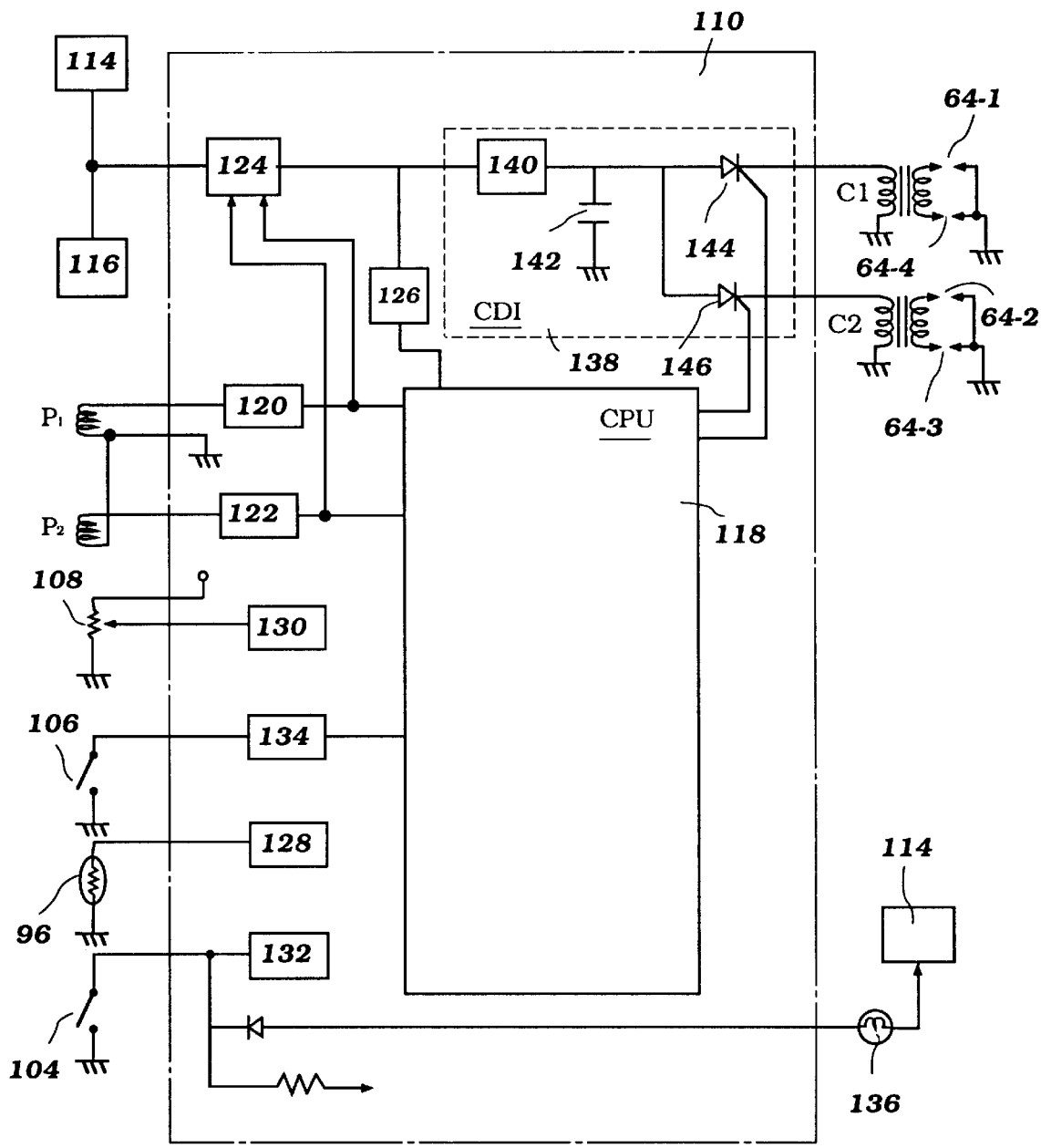
FIG. 3 is a schematic diagram of an electrical system of the outboard motor illustrated in FIG. 1, the electrical system including an ignition timing control system in accordance with the present invention.

FIG. 3 illustrates an electrical system associated with the watercraft 20. The electrical system includes the ignition timing control system 110.

The electrical system includes a base or primary power supply. This base power supply preferably comprises a battery 114. As illustrated in FIG. 1, the battery 114 may be conveniently mounted in the watercraft 20.

As seen in FIG. 3, the electrical system also includes a secondary power supply. This power supply comprises an alternating current generator 116 associated with the engine 40. The generator 116 is preferably driven by the crankshaft 48 of the engine 40. Either the battery 114 or generator 116 provides power to the ignition timing control 110. Although not illustrated, the kill and main switches 38, 39 are preferably arranged to selectively permit or prevent power from flowing from these power sources to the ignition timing control 110.

First and second pulser coils P1, P2 are used to generate and output a timing signal. Each pulser coil P1, P2 provides an output signal or spike at a specific time dependent upon engine speed, such as when a member mounted on a flywheel of the engine 40 passes by a pick-up element (see FIG. 2).

In this arrangement, the first pulser coil P1 provides an ignition timing signal corresponding to the spark plugs 64-1, 64-4 (see FIG. 3) of the first and fourth cylinders 44, while the second pulser coil P2 provides such a signal corresponding to the spark plugs 64-2, 64-3 of the second and third cylinders 44. The output of the pulser coils P1, P2 is provided to a central processing unit (CPU) 118 of the ignition timing control 110 through a respective input circuit 120, 122.

Power is provided to the CPU 118 through a non-contact type switch 124 through an constant voltage circuit 126.

The temperature sensor 96 associated with the cooling system outputs temperature data to the CPU 118 through an input circuit 128. Likewise, the output of the throttle valve position from the throttle position sensor 108, the output of the oil pressure switch 104, and the output of the shift position sensor 106 all pass through appropriate input circuits 130, 132, 134 to the CPU 118.

When insufficient oil pressure is sensed by the switch 104, an alarm or lamp 136 is activated. A load or resistance R is associated with the alarm or lamp circuit, as is well known. The alarm or lamp 136 is preferably mounted at or near the control panel 34 of the watercraft 20.

The ignition system includes a capacitor-discharge ignition (CDI) circuit 138. This circuit 138 includes a control 140 which is powered and which is arranged to control the charging of a charging condenser 142.

The spark plugs 64-1, 64-4 corresponding to the first and fourth cylinders 44 are associated with a first ignition coil C1. The spark plugs 64-2, 64-3 corresponding to the second and third cylinders are associated with a second ignition coil C2.

The first ignition coil C1 is linked through a first circuit to the charging condenser 142, and the second ignition coil C2 is lined through a similar second circuit. The CDI circuit 138 includes a first thyristor 144 positioned along the first circuit, and a second thyristor 146 is positioned along the second circuit. Both thyristors 144, 146 are controlled by an output signal from the CPU 118. When the CPU 118 sends an appropriate ignition signal to either of the thyristors 144, 146, they open and current is allowed to flow from the condenser 142 through the first or second circuit to the first or second ignition coil C1, C2, at which time a spark is induced at the spark plugs corresponding thereto.

Those of skill in the art will appreciate that in the four-cycle engine, each cycle comprises seven-hundred and twenty degrees of crankshaft rotation. In one three-hundred and sixty-degree rotation, each piston moves from top dead center downwardly to bottom dead center in an induction mode, then moves back to top dead center for combustion. In the next three-hundred and sixty degree cycle the piston moves downwardly as driven by the expanding combustion gasses, and then moves upwardly back to top dead center in an exhaust sequence.

In the engine arranged as described above, the piston corresponding to a pair of cylinders (such as the first and fourth cylinders) are generally in the same position, but three-hundred and sixty degrees apart in the operating cycle. In other words, when the piston corresponding to the first cylinder is at top dead center for combustion, the piston corresponding to the fourth cylinder is also at top dead center but in the exhaust sequence. Likewise, the second and third cylinders are so interrelated.

In the arrangement of the present invention, the spark plugs 64-1, 64-4 corresponding to the first and fourth cylinders are fired at the same time. The firing of the spark plug corresponding to cylinder which is in the combustion portion of the cycle is effective in initiating combustion, while the simultaneous firing of the spark plug corresponding to the other cylinder is ineffective since it is in exhaust mode. Thus, in each firing of both pairs of spark plugs 64-1/64-4 and 64-2/64-3 only one of the firings is "effective" or "actual" in the sense that it initiates combustion. Of course, the ignition system of the engine 40 may be arranged so that the ignition elements are fired independently.

The CPU 118 of the ignition control system 110 will now be described in reference to FIGS. 4–8. As will be appreciated from the description below, the CPU can comprise discrete components or can be integrated into a single chip.

Figure 4:
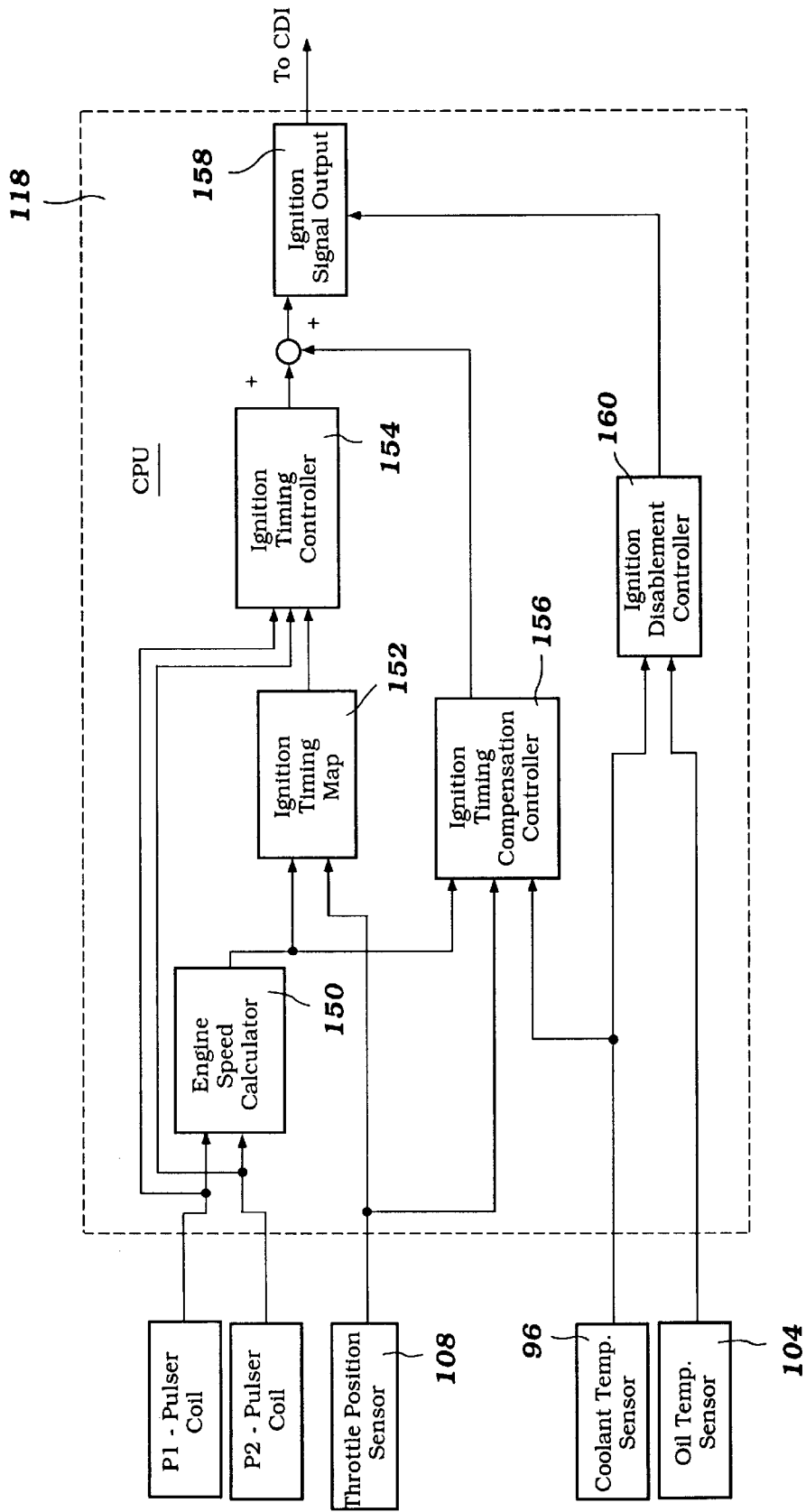
FIG. 4 is a schematic diagram illustrating in greater detail a processing unit of the ignition timing control system of the present invention.

As seen in FIG. 4, the CPU 118 includes an engine speed calculator 150 that, together with one or both of the pulser coils P1, P2, defines an engine speed detector. The engine speed calculator 150 is connected to the pulser coils P1, P2 so as to receive input signals from the pulser coils. The engine speed calculator 150 determines engine speed for the input signals, and outputs a data signal, which is indicative of the calculated engine speed.

An ignition timing map 152 is arranged to receive the data signal from the engine speed calculator 150. In one mode, the ignition timing map 152 comprises a memory device, such as, for example, a dedicated ROM or PROM. The ignition timing map 152 also receives an input signal from the throttle position sensor 108. Based upon the input data, the ignition timing map 152 outputs a data signal that indicates a base ignition timing signal.

An ignition timing controller 154 receives the data signal from the ignition timing map 152. The ignition timing controller also receives input signals from the pulser coils P1, P2. Based upon the input data, the ignition timing controller calculates and outputs an ignition timing signal.

The CPU 118 also includes an ignition timing compensation controller 156. The ignition timing compensation controller 156 is connected to the engine speed calculator 150, the throttle position sensor 108, and the coolant temperature sensor 96 so as to receive data signals from these devices. The received data signals are indicative of the engine speed, throttle valve position and coolant temperature sensed at the time of sampling. The ignition timing compensation controller 156 determines and outputs a signal which is indicative of an ignition timing compensation value. This output signal from the ignition timing compensation controller 156 combines with the ignition timing signal output by the ignition timing controller 154 to produce an adjusted ignition timing signal. The specifics of the ignition timing compensation controller 156 will be described below.

An ignition signal output device 158 receives the adjusted ignition timing signal. Based upon this signal, the ignition signal output device 158 sends out a firing command signal to the capacitor-discharge ignition circuit 138.

An ignition disablement controller 160 controls the ignition signal output 158. The ignition disabling controller 160 receives input signals from the coolant temperature sensor 96 and the oil temperature sensor 104. In the event that the engine 40 overheats or insufficient oil pressure exists, the ignition disablement controller 160 provides an output signal that is received by the ignition signal output device 158 to disable it. That is, the adjusted ignition timing signal received by the ignition signal output 158 is blocked and not sent out to the CDI 138. In another mode, the ignition disablement controller may provide an ignition timing signal which prevents the firing of the spark plug 64 that corresponds to one or more cylinders 44. This ignition signal is supplied to the ignition signal output 158 from the ignition disablement controller 160, which then is sent onto the thyristors 44, 46.

Figure 5:
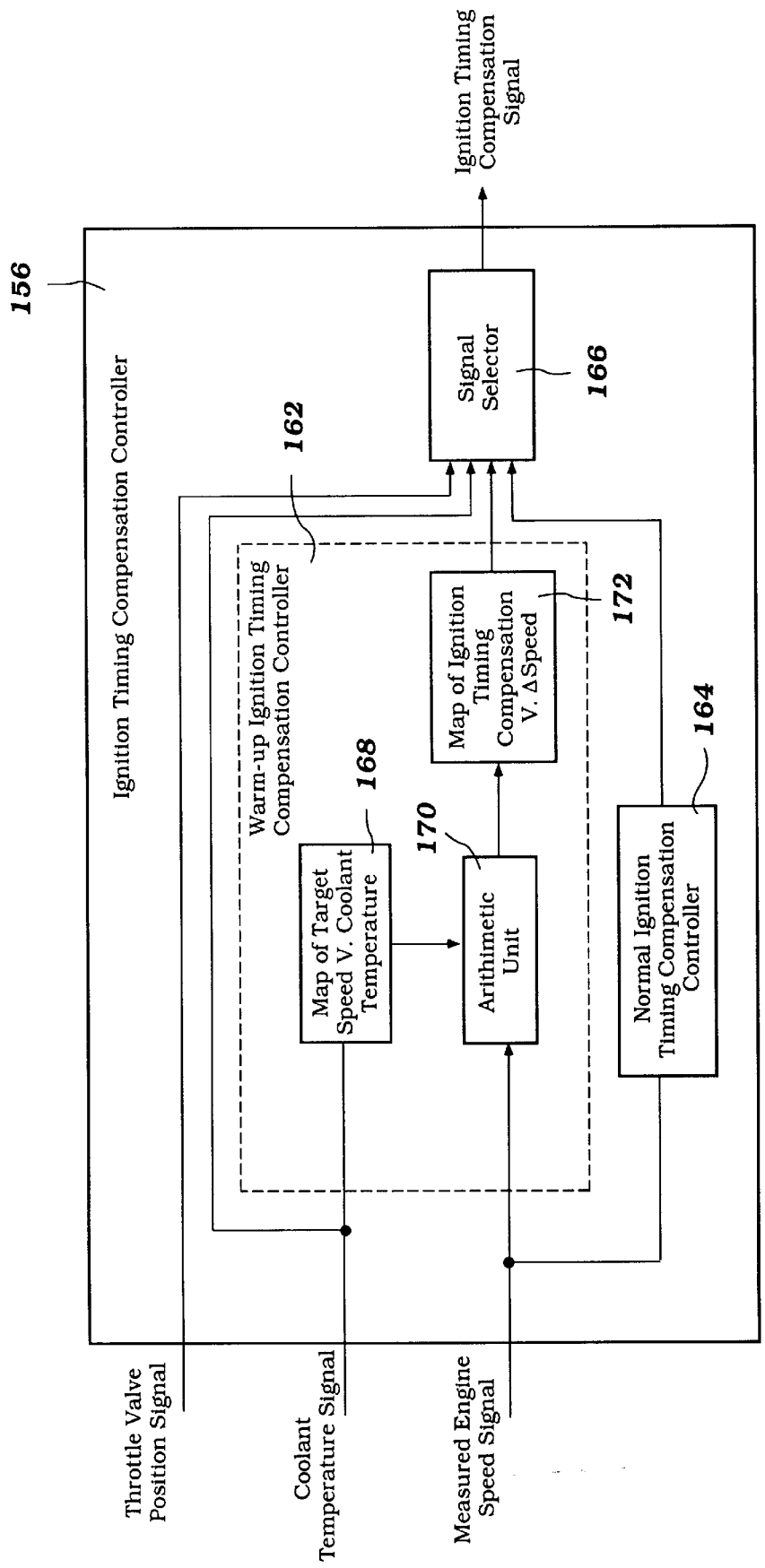
FIG. 5 is a schematic diagram illustrating in detail an ignition timing compensation controller of the ignition timing control system.

FIG. 5 illustrates the ignition timing compensation controller 156 in greater detail. The ignition timing compensation controller 156 desirably includes a warm-up ignition timing compensation controller 162 and a normal ignition timing compensation controller 164. A signal selector 166 is connected to each of these ignition timing compensation controllers 162, 164 and receives ignition timing compensation signals from each controller 162, 164. The signal selector 166, based upon a plurality of input conditions, selects one of the signals as an output from the selector 166. This output comprises the ignition timing compensation signal which is combined with the ignition timing signal from the ignition timing controller 154, as described above.

Figure 6:
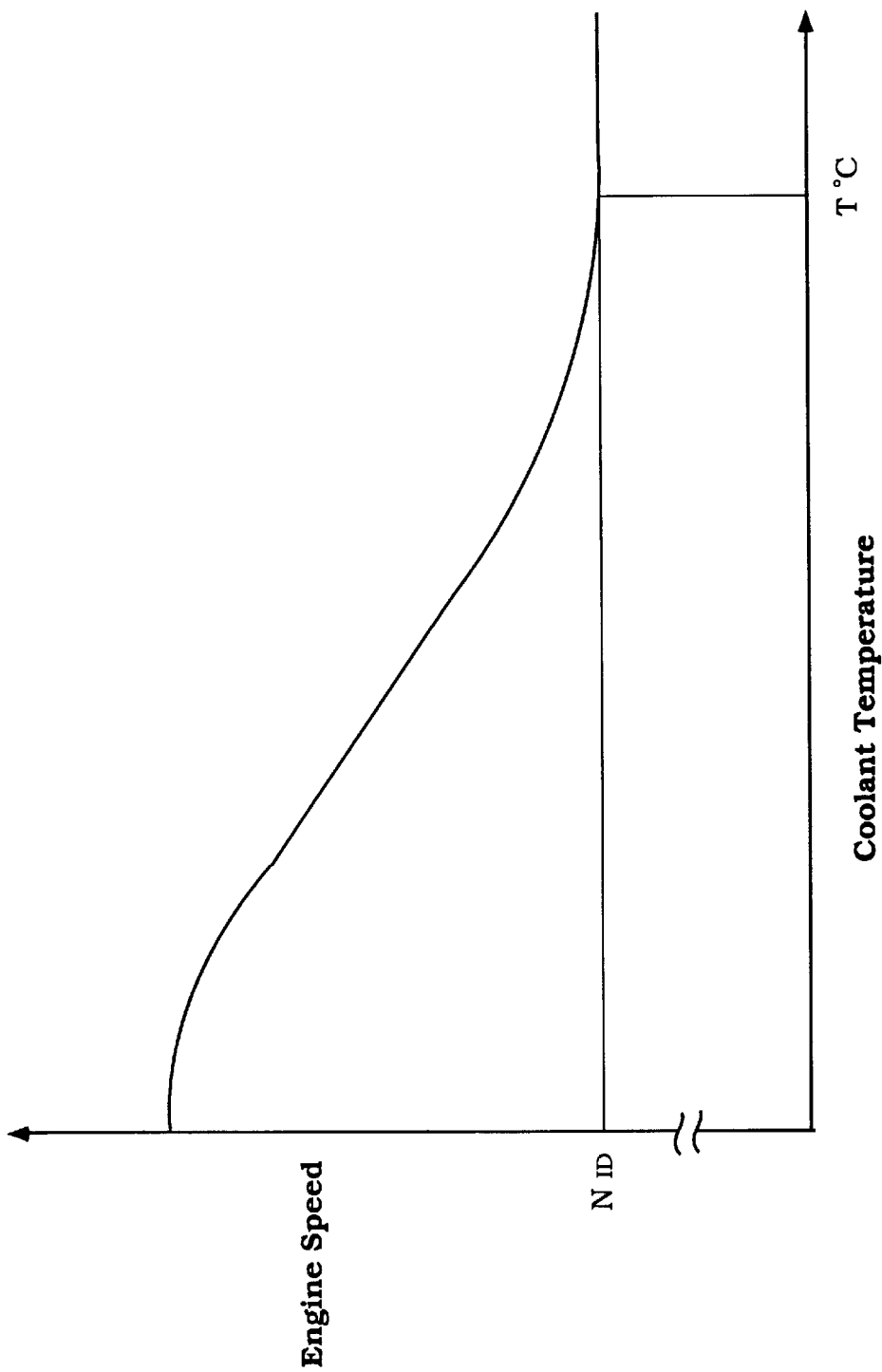
FIG. 6 is a map illustrating target engine speed versus coolant temperature.
Figure 7:
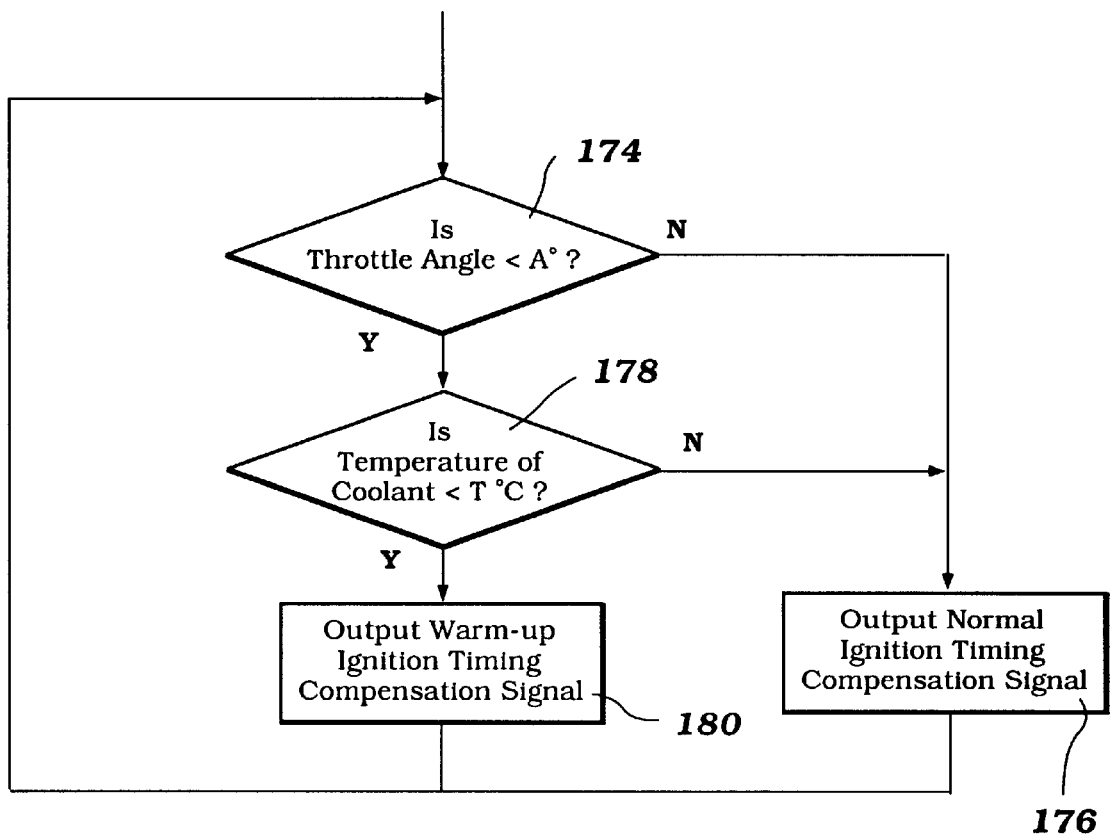
FIG. 7 is a flow chart of a decision process performed by processing logic of the ignition timing compensation controller.

The warm-up ignition timing compensation controller 162 includes a map device 168, which, in one mode, takes the form of a memory device, such as, for example, a dedicated ROM or PROM. The memory device 168 includes a map of target speeds versus engine or coolant temperature. FIG. 6 illustrates an exemplary map for these engine conditions. The map device 168 receives an input signal from the coolant temperature sensor 96, which is indicative of the coolant temperature. Based upon this data, the mapped device outputs a data signal that is indicative of a desired target speed for the sensed coolant temperature.

An arithmetic unit 170 is connected to the map device 168 to receive the outputted data signal. The arithmetic unit 170 also receives an input signal from the engine speed calculator 150, that corresponds to the measured engine speed. The arithmetic unit 170, in one mode, comprises an adder/subtractor which produces an output signal that is indicative of the difference between the measured engine speed and a target engine speed (i.e., A speed) for the particular coolant temperature sensed.

A second map device 172 receives the outputted data signal from the arithmetic unit 170. Again, the map device 172 in one mode can be a memory device, such as, for example, a dedicated ROM or PROM. The map device 172 desirably includes a map of ignition timing compensation values versus a required change in speed (A speed). Thus, based upon the required change in speed, as indicated by the input signal, the mapped device 172 outputs a signal that is indicative of an ignition timing compensation value when the engine is in a warm-up condition (i.e., a low-temperature idle condition). This signal, as noted above, is sent to the signal selector 166.

The normal ignition timing compensation controller 164 is connected to the engine speed calculator 150 so as to receive an input signal from this device. Based upon the measured engine speed, the normal ignition timing compensation controller 164 outputs a signal which is indicative of the normal ignition timing compensation value. In one mode, the normal ignition compensation controller 164 compensates the ignition timing to account for acceleration and deceleration of the engine in order to optimize engine performance. If the engine speed is accelerating, the ignition timing is advanced (i.e., the firing timing is earlier than the regular firing timing). If the engine speed is decelerating, the ignition timing is delayed (i.e., the firing timing is later than the regular firing timing). Of course, the amount of compensated delay or advanced is dependent upon the detected rate of acceleration or deceleration. The normal ignition timing compensation controller 164 thus may take into account accelerating or decelerating conditions which the controller 164 determines and outputs a corresponding compensation value to optimize engine performance. The signal selector 166 receives this outputted signal from the normal ignition timing compensation controller 164.

The signal selector 166 desirably includes processing logic. The processing logic can take the form of a simple multiprocessor or logic circuitry. The processing logic of the signal selector 166 performs the decision process represented in FIG. 7. Through this decision process, the signal selector 166 determines which ignition timing compensation signal to output, depending upon whether the engine is operating during a warm-up phase (i.e., a low-temperature idle condition) or a normal condition (i.e., after the engine has warmed to a sufficient degree, such as, for example, 40° C.).

The decision process is based upon several input conditions that relate to throttle valve position and coolant temperature. For this purpose, the signal selector 166 is connected to the throttle valve position sensor 108 and to the coolant temperature sensor 96. The signal selector 166 receives signals from both sensors 108, 96, which are indicative of the throttle valve position and the coolant temperature.

The processing logic of the signal selector 166 performs the following decision process loop based upon the information received from the throttle position sensor 108 and the coolant temperature sensor 96. The processing logic determines whether the throttle angle is open to a degree less than a preset throttle angle, as represented in decision block 174. If the sensed throttle angle is greater than the preset throttle angle (A°), the signal selector 166 outputs the normal ignition timing compensation signal, as represented in operation block 176. If, however, the sensed throttle angle is less than the preset throttle angle (A°), the decision process then determines whether the sensed temperature of the coolant is less than a preset threshold temperature (T° C.), as represented in decision block 178. This threshold temperature, for example, may be 40° C. If the sensed temperature of the coolant is greater than the threshold temperature, the signal selector 166 outputs the normal ignition timing compensation signal, as represented in operation block 176. If, however, the sensed temperature of the coolant is less than the threshold temperature (e.g., 40° C.), the signal selector 166 outputs a warm-up ignition timing compensation signal, as represented in operation block 180. As noted above, one of the timing compensation signals is combined with the ignition timing signal output from the ignition timing controller 154. In this manner, the warm-up ignition compensation signal is selectively combined with the ignition timing signal.

Figure 8:
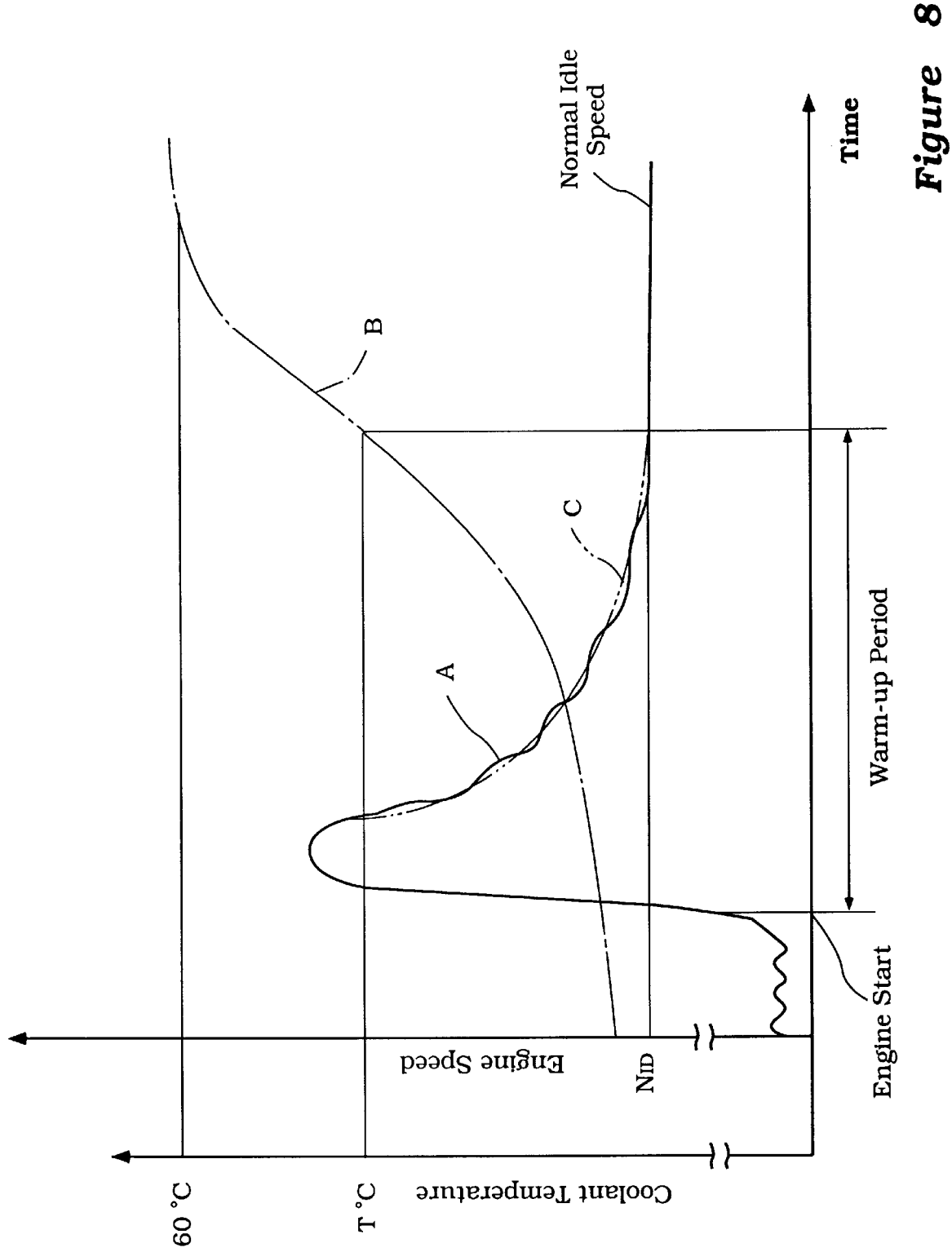
FIG. 8 depicts two overlayed two-axis graphics, one graph represents engine speed (vertical axis) versus time, and the other graph represents coolant temperature (vertical axis) versus time during engine warm-up.
Figure 9:
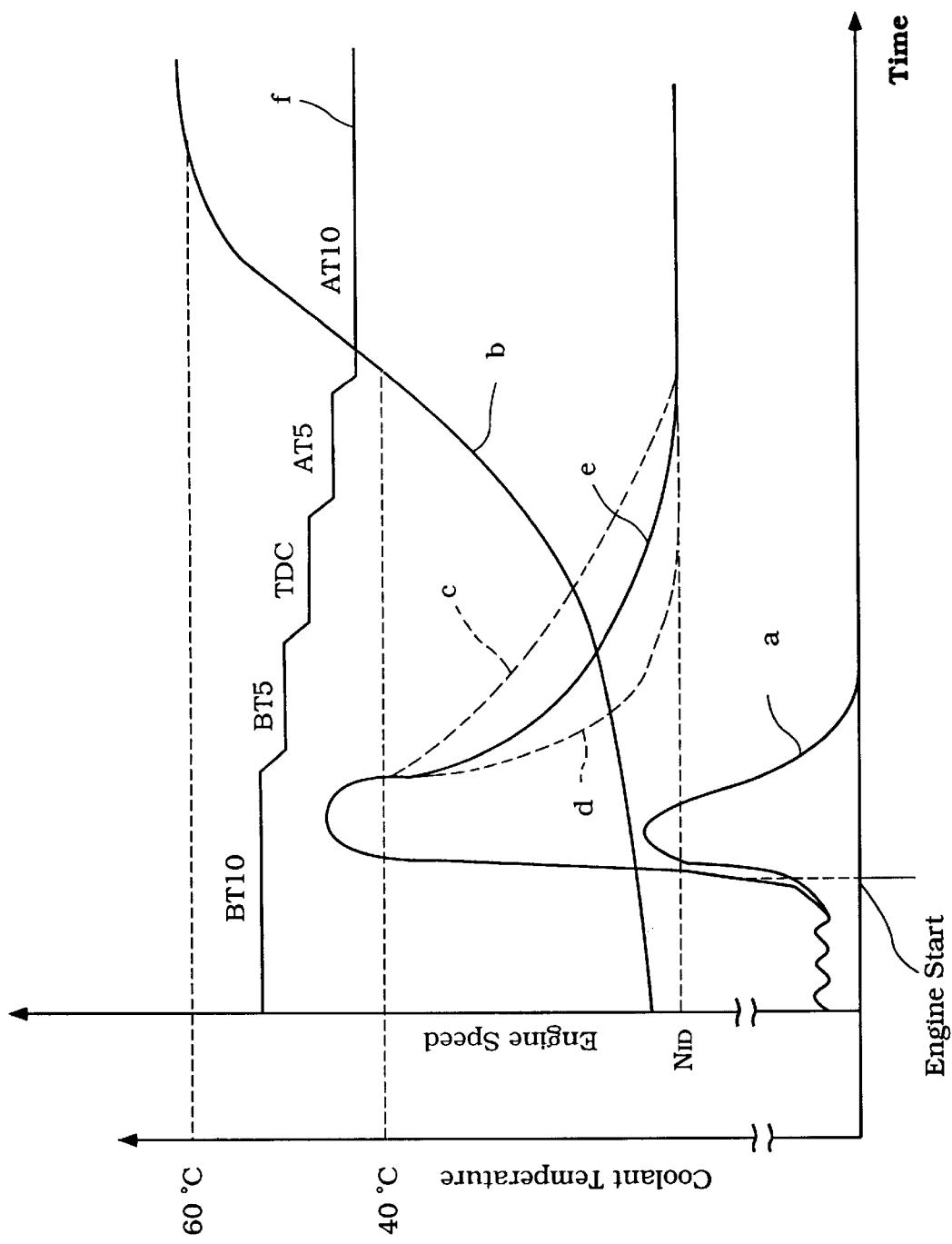
FIG. 9 is a graph illustration of an ignition timing (curve f), engine speed (curves c, d, e), coolant temperature (curve b) and fuel volume (curve a) versus time during engine warm-up in accordance with a previous engine control method described above.

In operation, the ignition timing compensation controller 156 determines whether the engine is in a warm-up mode or in a normal mode of operation. During engine startup and the warm-up period, as graphically illustrated in FIG. 8, the CPU 118 adjusts the ignition timing in order to initially rev the engine when first started, and then allows the engine speed to decrease to a normal idle speed ($N_{ID}$) during the warm-up period in accordance with a designed or targeted decay, as seen in FIG. 8. The ignition timing compensation controller 162 allows for the actual engine speed (A) to better approximate the targeted engine speed (C) during the warm-up period. The warm-up period, as understood from FIG. 8, is that period of time between engine start and the time when the coolant temperature warms to a targeted temperature (T° C.). As represented by the graph of actual engine speed (curve A) and the targeted engine speed (curve C), the ignition timing compensation controller 162 retards the ignition timing to decrease engine speed (A) when the sensed engine speed exceeds the targeted engine speed (C) for a given temperature. The ignition timing compensation controller 162 also advances ignition timing when the measured engine speed (A) falls below the targeted speed (C). In this manner, the actual engine speed (curve A) generally matches the targeted engine speed (curve C) so as to optimize engine performance during the warm-up period. In addition, this control method advances the improved function of the transmission 74 during this period as the idle speed is allowed to settle to a normal idle level in a relatively short period of time. Thus, the transmission 74 can be engaged shortly after engine startup without experiencing significant mechanical shock or difficulty when attempting to shift the transmission 74 from neutral to either a forward or reverse drive condition.

Although this invention has been described in terms of a certain preferred embodiment, other embodiments apparent to those of ordinary skill in the art are also within the scope of this invention. Accordingly, the scope of the invention is intended to be defined only by the claims that follow.

What is claimed is:

1. A method of controlling ignition firing timing of an ignition element associated with an engine, the engine including an intake system having at least one throttle valve and a cooling system containing coolant, the method involving sensing coolant temperature and an opening degree of the throttle valve, determining engine speed, determining ignition timing based upon the determined engine speed and the sensed throttle valve opening degree, detecting a low-temperature idle state of the engine based upon the sensed coolant temperature, and compensating the ignition timing by advancing or delaying the determined ignition timing while the engine is in the low temperature idle state such that the sensed engine speed generally matches a preset target engine speed corresponding to the sensed coolant temperature.

2. A method as in claim 1, wherein compensating the ignition timing involves comparing the target engine speed with the sensed engine speed to determine a required change in engine speed necessary to match the target engine speed.

3. A method as in claim 2, wherein compensating the ignition timing additionally involves determining warm-up control compensation value for ignition timing based upon the determined required change in engine speed, and adjusting the determined ignition timing by the warm-up control compensation value for ignition timing.

4. A method as in claim 3, wherein adjusting the determined ignition timing involves combining a first control signal, which is indicative of the determined ignition timing, with a second control signal, which is indicative of the warm-up control compensation value for ignition timing.

5. A method as in claim 3, wherein the warm-up control compensation valve is chosen from a map of certain engine conditions.

6. A method as in claim 1 additionally involving determining a normal compensation value for ignition timing based upon sensed engine speed, and adjusting the determined ignition timing by the normal compensation valve for ignition timing when a low-temperature idle state of the engine is not detected.

7. A method as in claim 1, wherein the ignition timing is chosen from a map of certain engine conditions.

8. A method as in claim 1, wherein the determining engine speed involves receiving output signals from at least one pulser coil associated with the engine.

9. A control system for controlling ignition firing of an engine ignition element, the engine including an air intake system having at least one throttle valve and a cooling system containing coolant, said control system comprising an engine speed detector, a crankshaft angle detector, a coolant temperature sensor, an ignition timing controller connected to the crankshaft angle detector and the engine speed detector so as to receive signals therefore indicative of a crankshaft angle of the engine and engine rotational speed, respectively, said ignition timing controller outputting an ignition timing signal, and an ignition timing compensation controller connected to the coolant temperature sensor and to the engine speed detector to receive signals therefrom indicative of the coolant temperature and the engine speed, the ignition timing compensation controller outputting a warm-up ignition timing compensation signal that selectively combines with the timing signal output from the ignition timing controller to produce an adjusted timing signal.

10. A control system as in claim 9 additionally comprising a throttle valve sensor, another ignition timing compensation controller in communication with the engine speed detector, the another ignition timing compensation controller outputting a normal ignition timing compensation signal, and a selector that receives the warm-up ignition timing compensation signal and the normal ignition timing compensation signals for the ignition timing compensation controllers, and receives input condition signals from the throttle valve sensor and the coolant temperature sensor and outputs one of the received compensation signals for combination with the ignition timing signal from the ignition timing controller.

11. A control system as in claim 9, wherein the ignition timing compensation controller includes a first memory device that receives an input signal from the coolant temperature sensor and outputs a signal indicative of a preset target engine speed for the sensed coolant temperature, an arithmetic unit receiving the output signal from the memory device and an input signal from the engine speed detector, and outputting a data signal indicative of the difference between the sensed engine speed and the preset target engine speed, and a second memory device receiving the data signal from the arithmetic unit, and outputting the warm-up ignition timing compensation signal indicative of a desired change in ignition timing so as to increase or decrease the speed of the engine to approximate the preset target speed for the sensed coolant temperature.

12. A control system as in claim 9 additionally comprising an ignition disablement controller that receives an input signal from at least the coolant temperature sensor, an ignition signal output controller that receives the adjusted ignition timing signal and an output signal from the ignition disablement controller, and selectively outputs the adjusted ignition timing signal to a capacitor-discharge ignition circuit of the engine depending upon the output signal received from the ignition disablement controller.

13. A control system as in claim 9, wherein the engine speed detector comprises at least one pulser coil that produces an output signal, and an engine speed calculator that receives at least the output signal from the pulser coil.

14. A control system as in claim 9, wherein the crankshaft angle detector comprises at least one pulser coil.

15. A control system as in claim 9 additionally comprising a throttle valve sensor, and a memory device that receives input signals from the engine speed detector and throttle valve sensor, and outputs a data signal to the ignition timing controller that is indicative of a preset ignition timing for the sensed engine speed and throttle valve opening degree.

16. An control system for controlling ignition firing of an engine ignition element, the engine including an air intake system having at least one throttle valve and a cooling system containing coolant, said control system comprising an engine state detection means for detecting whether the engine is accelerating, an ignition control means for determining a basic ignition timing based upon a determined operational state of the engine as detected by the engine state detection means, a low-temperature idle condition detection means for detecting a low temperature idle condition based upon coolant temperature and the operational state of the engine as detected by the engine state detection means, and compensation means for compensating the basic ignition timing to an advance or delay side while the engine is in the low-temperature idle condition so as to approximate a preset target engine speed that corresponds to coolant temperature.

17. A control system as in claim 16 in combination with an engine, the engine including intake means for increasing intake air volume while the engine is in the low-temperature idle state.

18. The combination of claim 17, wherein the compensation means compensates the basic ignition timing to approximate the preset target engine speed while the engine intake means increased the intake air volume.

19. A method of controlling ignition firing timing of an ignition element associated with an engine, the engine including an intake system having at least one throttle valve and a cooling system containing coolant, the method involving sensing coolant temperature and an opening degree of the throttle valve, determining engine speed, determining ignition timing based upon the determined engine speed and the sensed throttle valve opening degree, detecting a low-temperature idle state of the engine based upon the sensed coolant temperature, and determining a target engine speed based on the sensed coolant temperature, comparing the target engine speed with the sensed engine speed to determine a required change in engine speed to match the target engine speed, determining a warm-up control compensation value for ignition timing based upon the determined required change in engine speed, and adjusting the determined ignition timing by the warm-up control compensation value for ignition timing such that the ignition timing is compensated to an advance or delay side while the engine is in the low-temperature idle state so as to adjust engine speed to generally match a preset target engine speed corresponding to the sensed coolant temperature.

20. A method as in claim 19, wherein adjusting the determined ignition timing involves combining a first control signal, which is indicative of the determined ignition timing, with a second control signal, which is indicative of the warm-up control compensation value for ignition timing.

21. A method as in claim 19, wherein the warm-up control compensation valve is chosen from a map of certain engine conditions.

* * * * *